Oct. 31, 1967  R. G. STACY ETAL  3,349,874
RAILWAY DISC BRAKE
Filed Dec. 30, 1965  2 Sheets-Sheet 1
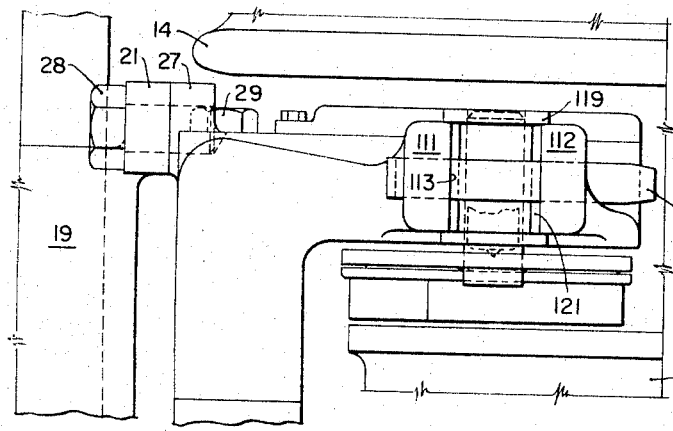
Fig.1
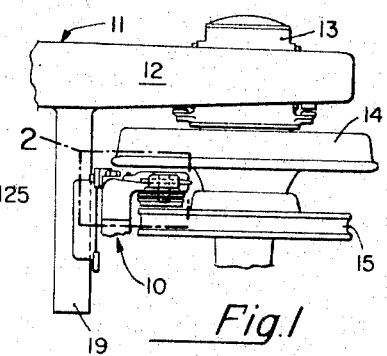
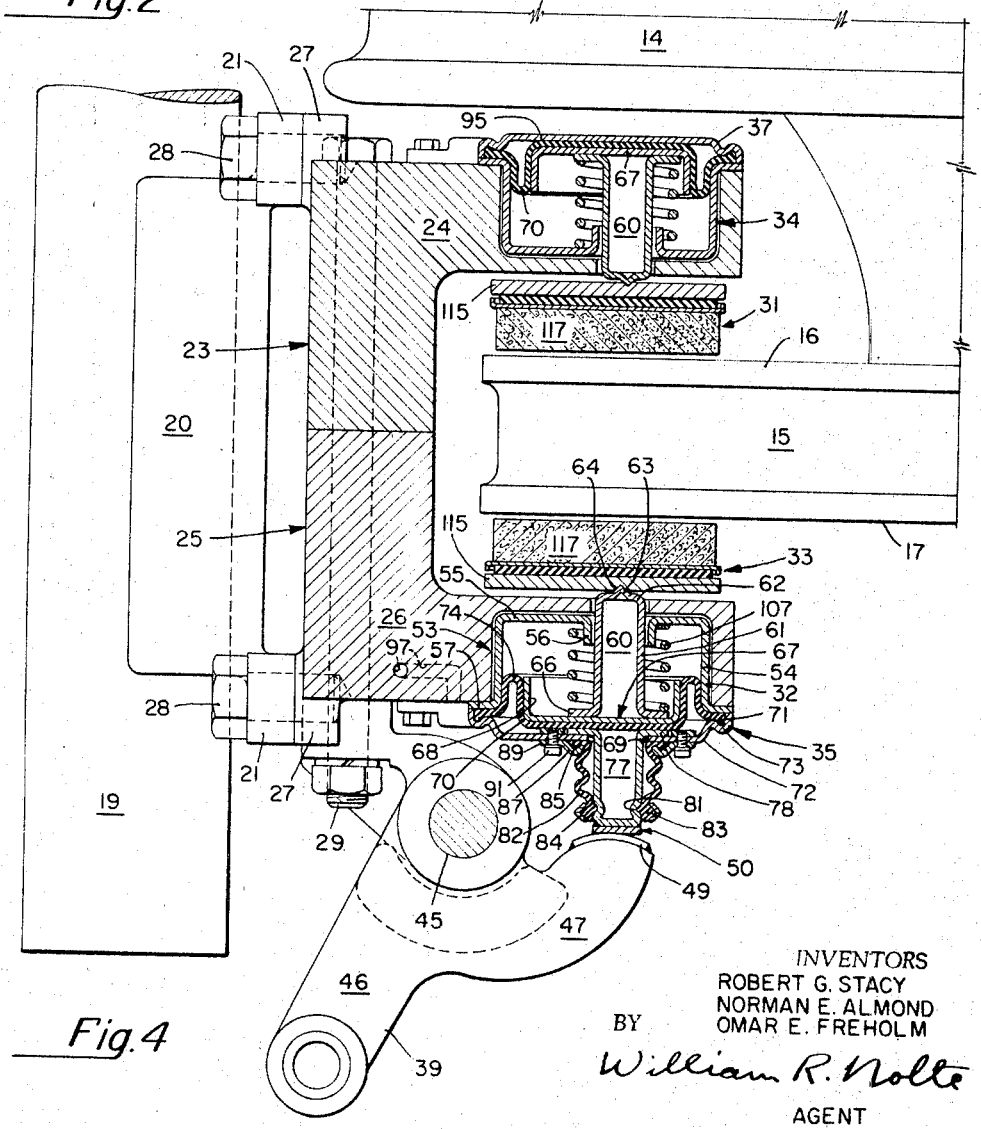
Fig.2
Fig.4
INVENTORS
ROBERT G. STACY
NORMAN E. ALMOND
OMAR E. FREHOLM
BY William R. Nolte
AGENT Oct. 31, 1967   R. G. STACY ETAL   3,349,874
RAILWAY DISC BRAKE
Filed Dec. 30, 1965   2 Sheets-Sheet 2
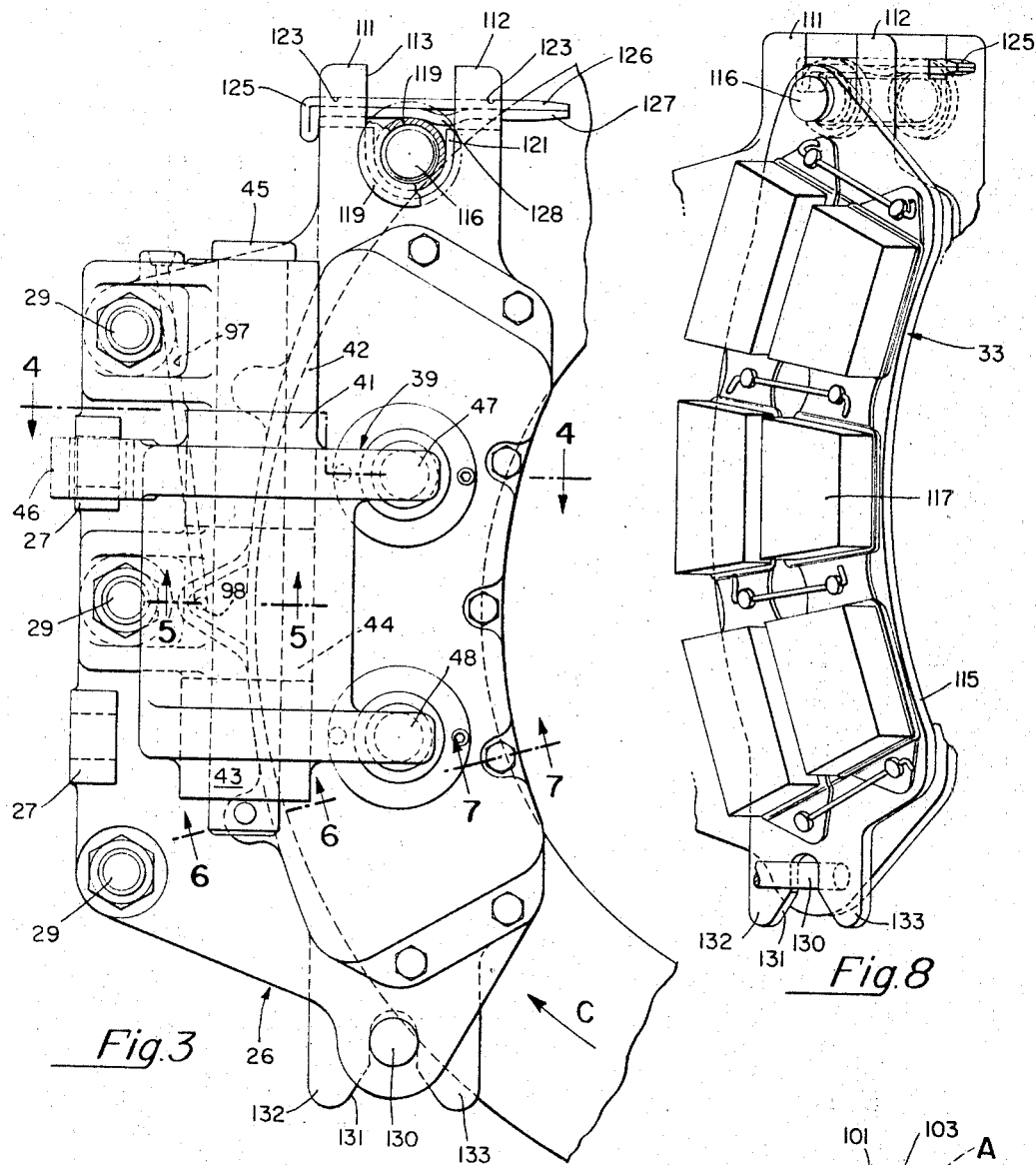
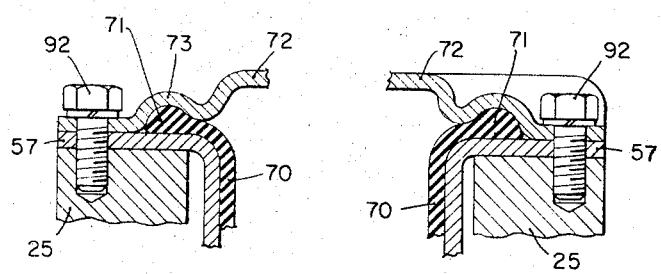
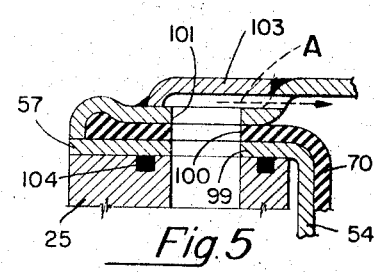
INVENTORS
ROBERT G. STACY
NORMAN E. ALMOND
OMAR E. FREHOLM
BY
William R. Nolte
AGENT United States Patent Office 3,349,874
Patented Oct. 31, 1967

3,349,874
RAILWAY DISC BRAKE
Robert G. Stacy, Meadowbrook, Norman E. Almond, Levittown, and Omar E. Freholm, Jenkintown, Pa., assignors to The Budd Company, Philadelphia, Pa., a corporation of Pennsylvania
Filed Dec. 30, 1965, Ser. No. 517,654
5 Claims. (Cl. 188—107)

ABSTRACT OF THE DISCLOSURE

Disc brake apparatus for railway cars utilizing caliper castings and incorporating diaphragm type pressure pods which are direct acting upon brake shoes supported between rotating brake disc and the castings. A hand brake or parking brake arrangement mounted on one of the castings utilizes existing structure of the pressure pods to secure manual or hand braking action.

This invention relates to improved railway disc brake apparatus for railway cars, and more particularly, to automatically operated brake apparatus having manual brake elements associated therewith.

One type of disk brake apparatus which heretofore has been employed in railway cars utilizes automatically controlled pneumatic actuators combined with hand brake apparatus. In such arrangements the hand brake apparatus is operated separately and independently of the pneumatic actuators. The pneumatic actuators include movable parts which make contact with brake shoes over a first area of the shoes to effect an automatic braking operation. Thereafter when the hand brake apparatus is manually actuated it makes contact with the brake shoes independently of the pneumatic actuators to exert pressure on different areas of the brake shoes. Thus, in the limited space available, two independent sets of elements must be mounted to appropriately apply braking forces to the rotating disks. This has resulted in increased complexity of the mechanisms so employed and has required a larger number of manufactured parts with consequent increased total cost of the apparatus. In addition, since the area of the brake shoe at which pressure from the automatic mechanism is applied is usually the ideal location, it has been necessary in order to apply suitable forces to the brake shoes by the manual apparatus at areas of the brake shoe which are less than ideal. Thus, the overall efficiency of the combined mechanisms has been less than that which has been desired.

It is an object of this invention therefore to provide improved railway disk brake apparatus incorporating automatic and manual actuating mechanisms and which thereby avoid one or more of the disadvantages of the prior art arrangements and which also have an improved efficiency.

In accordance with the present invention, disk brake apparatus is provided for use on a truck or a railway car. The truck may be of any conventional type including a wheel-axle unit with a rotatable brake disk mounted on the axle. Stationary support means are provided opposite the outer peripheral edge portion of the brake disk to support the brake apparatus thereon. Suitable brake shoe assemblies may be mounted between the support means and the outer surfaces of the brake disk for movement into frictional engagement with the disk. Such movement is accomplished in one form of operation by an actuator suitably housed within each such arm portion. Automatic controls which include a suitable pressure source, either pneumatic or hydraulic are provided to actuate movable means of the actuators to achieve frictional coaction of the brake shoes with the rotating surfaces of the disk. Means are also provided to manually actuate at least one of said actuators to lock its associated brake shoe against the rotating disk to thereby lock the railway car against movement in a parking state independently of the automatic control means.

For a better understanding of the present invention, together with other and further objects thereof, reference is had to the following description taken in conjunction with the accompanying drawings in which FIG. 1 is a top plan view of a railway car truck provided with disk brake apparatus embodying the invention; FIG. 2 is an enlarged top plan of a detailed view partly in section of a portion of the apparatus shown in FIG. 1; FIG. 3 is a side elevational view of the apparatus shown in FIG. 1; FIG. 4 is a sectional view taken along the lines 4—4 of FIG. 3; FIGS. 5, 6, and 7 are sectional views taken along the lines 5—5, 6—6, and 7—7 respectively of FIG. 3; FIG. 8 is a side elevational view of a brake shoe of the apparatus partially in perspective.

Referring now to FIGS. 1 to 3, the brake assembly 10 embodying the present invention is shown mounted upon a railway truck 11 of known type and construction. The truck includes side frames 12, only one of which is shown, with suitable supports for wheel-axle units 13 which carry wheels 14, and brake disks 15 mounted inboard of the wheels. The disk includes inner and outer braking surfaces 16 and 17 respectively. While a separate brake disk has been illustrated, it is apparent that a wheel construction which incorporates integral disk portions or brake surfaces could be employed in lieu of such separately mounted brake disks 15.

The brake assembly 10, as seen in FIGS. 1, 2 and 4, is mounted upon a transverse brake tube support 19 which extends in parallel relationship with the wheel-axle unit 13 and is supported at its transverse ends by side frames 12 of the truck. A stationary cast support 20 is shown affixed to the tube support 19 and has secured thereon a pair of arm members 23, 25. To facilitate such securement support 20 includes bosses 21, arm portions 23, 25 include bosses 27 at their opposite ends which are suitably drilled and fastened as by bolts 28. Additionally, the arm portions 23, 25 are secured in a transverse direction one to another by means of elongated bolts 91. Arm member 23 includes an elongated portion 24 which extends in a direction parallel to and overlaps the surface 16 of the disk while arm member 25 includes a like elongated portion 26 which extends in like spaced relationship from the opposite surface 17 of the disk. The arm members 23, 25 also extend downwardly and arcuately following the curvature of the outer periphery of the disk as seen in FIG. 2. A pair of brake shoes 31, 33 are mounted in the spaces between the arms 24, 26 and the surfaces 16, 17 respectively of the disk. Arm 26 includes an elongated cavity 32, generally kidney shaped, and into which is received a pneumatic actuator 35, while arm 24 includes an elongated cavity 34 into which is received pneumatic actuator 37.

Arm members 23, 25 are generally similar in construction, however, Arm member 25 differs from arm member 23 in that it includes provisions for mounting manually movable hand brake apparatus which in the present form includes a bellcrank 39. As best seen in FIG. 3 bellcrank 39 is formed with upper and lower spaced fulcrum bosses 41 and 43 which are aligned with spaced bosses 42, 44 of member 25. A pivot pin 45 supports the bellcrank for rotational movement about the axis of said pivot. As seen in FIG. 3 the bellcrank 39 includes a first arm 46 and a pair of second arm portions 47, upper and 48, lower. The latter arms include at each of their extremities a wear plate 49 which coacts with pressure button 50 of actuator 35.

With reference now to FIG. 4, the actuator 35 includes a housing 53 which includes sidewalls 54, and a bottom wall 55 which includes two openings defined by outwardly turned flanges 56 which constitute sleeve means for axial movement of plunger means 60 each of the latter disposed opposite upper and lower arms 47, 48 of bellcrank 39. The outer margins of the sidewalls include laterally extending flanges 57. The plunger means 60 each includes a cylindrical walled base portions 61 which rides in the aforementioned openings defined by flanges 56 and each includes an inner registering wall 62 which converges into a cone shaped tip 63. Each tip is received within a complemental cone shaped depression of the backing plate 64 of the brake assembly to constitute a centering register. The outer portion of the cylindrical wall 61 includes laterally turned flanges 66 which are in turn affixed to an elongated plate or head 67. The head includes inwardly turned flanges 68 to define a piston of the plunger head. Extending outwardly and axially aligned with the axis of each of the plunger cylindrical shank portions 61 of plunger 60 is the aforementioned pressure button 50. A roll type diaphragm 70 engages the top surface of the head 67 and includes an enlarged beaded edge 71 which is gripped by the curled edge 73 of cover 72. The diaphragm includes a looped portion 74 positioned between the inner wall surface of housing 54 and the inwardly turned flanges 68 of the plunger head 67. Extending outwardly and axially aligned with the axis of each of the plungers 60 is the aforementioned pressure button 50. It likewise includes an elongated cylindrical shank portion 77 with outwardly extending flanges 78 from its base. Travel of the pressure button outwardly is limited by engagement of flanges 78 with the inner marginal surface of aperture 69 in cover 72. The outer extremity of the pressure button includes an annular depression 81 encircling its upper portion to receive therein enlarged bead 83 of bellows type boot 82. A circular clamp 84 secures the outer enlarged bead of the boot within the annular recess 81 in air sealing engagement therewith. The inner edge of the boot likewise includes an enlarged beaded edge 85 which is clamped to the upper surface of cover 72 into an airtight sealing engagement about the marginal edge of the aforementioned aperture 79 of said cover 72. For this purpose circular clamping ring 87 curls about the top of the bead 58 and includes a straight portion 89 which inturn secured to cover 72 as by screws 91. As seen in FIGS. 6 and 7, the actuator 35 is secured in place within arm member 25 as by screws 92 disposed about its outer margins and which extend through the cover and out-turned flanges 56 of the housing 53.

With reference now to FIG. 4 it is observed that the actuator 34 is of generally like construction as that of actuator 35. However the actuator 34 does not include the aforementioned pressure buttons 50 of actuator 35 and as a consequence the cover 95 thereof is straight through and does not require apertures 79 as found in cover 72.

Referring now to FIG. 3 it is observed that the arm portion 25 includes a vertical disposed opening 97 and a horizontal coextensive opening 98, see also FIG. 5, which is aligned with openings 99, 100 and 101 in flange 57 and diaphragm 70 and cover 72 respectively. A ring seal 104 is provided between casting 24 and flange 56 of housing 54. The cover 72 is outwardly deformed as at 103 to permit the flow of a suitable fluid under pressure such as air to the top side of the diaphragm 70 as indicated by the direction of arrow A. Such application of pressure when suitably controlled is effective to move the pair of plunger shanks 60 along their axes to impart a like movement to brake shoe 33 thereby causing the latter to coact with surface 17 of brake disk 15. Such movement is effective to compress the plunger return spring 107 which encircles plunger 60. The upper end 108 of said spring engages the aforementioned flanges 63 of plunger shaft 61 while the lower end of said plunger return spring encircles the upturned flanges 57 and abuts the bottom wall 55 of the housing 53. When the fluid pressure is diminished, the plunger return spring is capable of restoring the plunger 60 to its initial position. When it is desired to manually operate the brake, a suitable force may be applied to arm 46 to rotate the hand brake crank in a counter-clockwise direction as seen in FIG. 3. This will cause the arms 47 and 48 to coact with their respective pressure button shanks 77. Such movement will cause the shanks 77 to move inwardly so that the flanges 78 integral therewith coact with the top surface of diaphragm 70. As seen in FIG. 7 such movement will cause the aforementioned plunger 60 to move in a like direction against the bias of coil spring 107 to thereby move brake shoe 33 into braking engagement with disk 15. In a similar manner release of the manual torque applied to the hand brake underarm 46 will enable the coil spring 107 to restore the plunger 60 to its initial release position and thereby relieve the pressure of brake shoe 33 of the disk 15.

Referring now to FIGS. 3 and 8 the upper extremities of arm portions 23 and 25 terminate in a pair of upwardly extending fingers 111, 112 which define therebetween a slot 113.

The brake shoe assembly 33 includes a rigid backing plate 115 from which at its upper end a pin 116 projects. The main body of the backing plate 115 is of an arcuate segmental form and the brake lining blocks 117 are removably mounted on a sheet metal stamping in the manner set out in U.S. Patents 2,451,329 Gaenssle and 2,451,326 Eksergian. As better seen in FIG. 3 the pin is encircled by a spool 119 which may be of a suitable bearing material such as nylon. The spool is nested within a U-shaped metallic bushing 121 received within the base of slot 113. The upwardly projecting finger portions 111, 112 of the side casing are notched as at 123 to receive key 125. The key includes first and second arm portions 126 and 127 bent in side by side engagement in hairpin configuration. The lower arm portion includes a downwardly depending bowed portion as at 128 which is shown in engagement with the top peripheral surface portion of the spool. The lower ear portion of the arm casting 26 includes an inwardly projecting hold pin 130 which is received in the slot 131 defined by the lower fingers 132, 133 of the brake shoe backing plate 115. As the brake shoe assemblies, 33, 34 are pressed into braking engagement with disk 15 rotating in the direction as indicated by arrow C, the torque applied to the lining via the brake block is transmitted to upper pin 116 and is resisted by the transverse key 125. The bow 128 in the lower arm of the key operates as a restoring spring to return the brake shoe to its original position, while the lower hold pin 130 prevents rotation of the brake shoe assembly 115 about the axis of the upper pin.

While there has been described what at present is considered to be the preferred embodiment of this invention, it will be obvious to those skilled in the art that various changes may be made therein without departing from the invention, and it is, therefore, aimed in the appended claims to cover all such changes and modifications as fall within the true spirit and scope of the invention.

What is claimed is:

1. A railway brake assembly for a rotatable wheel disk comprising in combination: stationary support means, mounting means secured to said support means and including an arm portion extending adjacent a surface of said disc, said arm portion carrying a brake shoe and actuator means therefor, means for providing a source of fluid pressure for automatically activating the actuator, said actuator including a housing with side walls and a cover, piston means received within said housing and including a rigid member having first and second sides and movable axially of said side walls, registering means extending from said first side of said piston means for engagement with said brake shoe, pressure button means disposed in operative engagement with said second side of said piston means, said cover including an aperture to permit movement of said pressure button means, a flexible resilient diaphragm secured at its marginal edges between said side walls and said cover and having one of its surfaces normally in engagement with said rigid member and manual means including a bellcrank mounted on said arm portion for movement from an inoperative position out of pressure engagement with said pressure button means, to an operative position in pressure engagement with said pressure button means, to thereby exert a force through said piston means to urge said brake shoe into braking engagement with said disk.

2. In the brake assembly as set forth in claim 1 wherein said pressure button means includes a movable shank portion extending through the aperture of said cover and a base flange portion in one position engaging the opposite surface of said diaphragm means to exert a brake applying force on said piston means, and in another position thereof to engage the marginal edge portions about the aperture of said cover.

3. In the brake assembly as set forth in claim 1 wherein the upper portion of said brake shoe means include a pin extending outwardly in a direction normal to one surface of said disk, said arm portion including a pair of upstanding fingers spaced one from another to define a slot to receive said pin, said fingers including openings and key means received in said openings and extending across said pin to retain said pin in said slot.

4. In the brake assembly as set forth in claim 3 wherein said key means are of resilient material and include a pair of arms aligned one with another, and wherein one of said arms is of arcuate shape and engages said pin to limit the movement of said brake shoe as torque is applied to the same from said rotatable disk.

5. In the brake assembly as set forth in claim 3 wherein the lower portion of said arm portion includes a hold pin disposed normal to the plane of rotation of said disk, and wherein the lower portion of said brake shoe includes bifurcated means engageable with said hold pin to limit the rotation of the brake shoe about the first named pin.

References Cited
UNITED STATES PATENTS

| | | | |
|---|---|---|---|
| 2,655,236 | 10/1953 | Bachman | 188—59 |
| 3,185,263 | 5/1965 | Schanz et al. | 188—106 |

DUANE A. REGER, *Primary Examiner.*